(12) United States Patent
Weiner

(10) Patent No.: US 7,369,773 B2
(45) Date of Patent: May 6, 2008

(54) METHODS AND SYSTEMS FOR POLARIZATION CONTROL AND POLARIZATION MODE DISPERSION COMPENSATION FOR WIDEBAND OPTICAL SIGNALS

(75) Inventor: Andrew M. Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 638 days.

(21) Appl. No.: 09/865,028

(22) Filed: May 24, 2001

(65) Prior Publication Data

US 2002/0060760 A1 May 23, 2002

Related U.S. Application Data

(60) Provisional application No. 60/206,863, filed on May 24, 2000.

(51) Int. Cl.
*H04J 14/02* (2006.01)
(52) U.S. Cl. .................... 398/81; 398/184; 398/192
(58) Field of Classification Search ................ 398/25, 398/43, 65, 79–88, 93–95, 140–141, 147, 398/149, 150, 152, 158, 159, 162, 177, 182–184, 398/192–195, 202–206, 208–210, 212, 213; 349/123, 127, 132, 143–146
See application file for complete search history.

(56) References Cited

U.S. PATENT DOCUMENTS 4,193,691 A * 3/1980 Fjarlie ...................... 356/330
5,037,173 A * 8/1991 Sampsell et al. ............. 385/17
5,090,807 A * 2/1992 Tai .............................. 356/310

(Continued)

FOREIGN PATENT DOCUMENTS

WO WO01/04674 A1 1/2001

OTHER PUBLICATIONS

Phase-dominant spatial light modulators, Horner, J.L.; Soref, R.A.; Electronics Letters , vol. 24 , Issue: 10 , May 12, 1988 pp. 626-627.*

(Continued)

*Primary Examiner*—Dzung Tran
(74) *Attorney, Agent, or Firm*—Fish & Richardson P.C.

(57) ABSTRACT

An optical processing method includes: receiving an optical signal from an optical system, wherein the optical signal is distorted by frequency-dependent polarization effects in the optical system; spatially dispersing frequency components of the distorted optical signal on a spatial light modulator (SLM); and independently adjusting the polarization transfer matrix of multiple regions of the SLM to reduce the distortion of the optical signal. A related optical processing method includes: providing a precompensation signal indicative of frequency-dependent polarization effects in a downstream optical system; spatially dispersing frequency components of an optical signal on a spatial light modulator (SLM); and independently adjusting the polarization transfer matrix of multiple regions of the SLM to at least partially precompensate the optical signal for distortions caused by the frequency-dependent polarization effects in the downstream optical system. Another related optical processing method includes: providing a model of the frequency-dependent polarization effects; spatially dispersing frequency components of the optical signal on a spatial light modulator (SLM); and independently adjusting the polarization transfer matrix of multiple regions of the SLM based on the model to emulate the optical signal transmission.

30 Claims, 6 Drawing Sheets

U.S. PATENT DOCUMENTS

| | | | | |
|---|---|---|---|---|
| 5,504,575 | A | * | 4/1996 | Stafford ..................... 356/330 |
| 5,535,029 | A | * | 7/1996 | Clark .......................... 349/96 |
| 5,719,650 | A | | 2/1998 | Wefers et al. |
| 5,808,800 | A | * | 9/1998 | Handschy et al. .......... 359/630 |
| 5,847,788 | A | * | 12/1998 | Hashimoto ................... 349/99 |
| 5,867,291 | A | * | 2/1999 | Wu et al. ..................... 398/49 |
| 5,946,116 | A | * | 8/1999 | Wu et al. ..................... 398/55 |
| 6,031,588 | A | * | 2/2000 | Dultz et al. ................... 349/25 |
| 6,111,700 | A | * | 8/2000 | Kobayashi et al. ......... 359/627 |
| 6,219,360 | B1 | | 4/2001 | Komine ......................... 372/9 |
| 6,273,571 | B1 | * | 8/2001 | Sharp et al. ................. 353/122 |
| 6,275,623 | B1 | * | 8/2001 | Brophy et al. ................. 385/14 |
| 6,327,068 | B1 | * | 12/2001 | Silberberg et al. .......... 359/239 |
| 6,385,357 | B1 | * | 5/2002 | Jopson et al. ................. 385/11 |
| 6,421,153 | B1 | * | 7/2002 | Way et al. .................. 398/152 |
| 6,504,943 | B1 | * | 1/2003 | Sweatt et al. ............... 382/103 |
| 6,556,320 | B1 | * | 4/2003 | Cao ............................. 398/65 |
| 6,671,464 | B1 | * | 12/2003 | Kikuchi ....................... 398/65 |

OTHER PUBLICATIONS

"SLM-based optical crossbars based on the matrix-matrix principle," White, H.; Stace, C.; Birch, M.J.; Walker A.C.; Taghizadeh, M.R.; Hall, T.J.; Crossland, W.A.; Optical Switching, IEE Colloquium on , Jun. 3, 1993 pp. 2/1-2/7.*

"Trends in knowledge base processing using optical techniques," Kottas, J.A.; Warde, C.; Systems, Man and Cybernetics, 1989. Conference Proceedings., IEEE International Conference on , Nov. 14-17, 1989 pp. 1250-1257 vol. 3.*

"Four-level, phase only, spatial light modulator," Broomfield, S.E.; Neil, M.A.A.; Paige, E.G.S.;☐☐Electronics Letters , vol. 29 , Issue: 18 , Sep. 2, 1993 pp. 1661-1663☐☐.*

"Liquid crystal-based optical time delay units for phased array antennas," Riza, N.A.;☐☐Lightwave Technology, Journal of , vol. 12 , Issue: 8 , Aug. 1994 pp. 1440-1447.*

"A femtosecond pulse-shaping apparatus containing microlens arrays for use with pixellated spatial light modulators," Mahoney, K.M.; Weiner, A.M.; Quantum Electronics, IEEE Journal of , vol. 32, Issue: 12 , Dec. 1996 pp. 2071-2077.*

"Optical computing," Ansari, N.I.; Athreya, M.S.; Gutta, S.V.R.; Potentials, IEEE ,vol. 11 , Issue: 4 , Dec. 1992 pp. 33-36.*

Gerard J. Foschini et al., "The Statistics of PMD-Induced Chromatic Fiber Dispersion," Journal of Lightwave Technology, 17:9:1560-1565, Sep. 1999.

Wefers et al., "Generation of High-Fidelity Programmable Ultrafast Optical Waveforms," Optics Letters, 20:9:1047-1049, May 1, 1995.

Weiner et al., "High-Resolution Femtosecond Pulse Shaping,"Journal of the Optical Society of America B, 5:8:1563-1572, Aug. 1988.

Weiner et al., "Programmable Shaping of Femtosecond Optical Pulses by Use of 128-Element Liquid Crystal Phase Modulator," IEEE Journal of Quantum Electronics, 28:4:908-920, Apr. 4, 1992.

Zhizhong Zhuang et al., "Polarization Controller Using Nematic Liquid Crystals," Optical Letters, 24:10:694-696, May 15, 1999.

Chang et al., "Higher-Order Fiber Dispersion Compensation Using a Pulse Shaper with a Programmable Phasae-Modulator Array," OFC '98. Optical Fiber Communication Conference and Exhibit. Technical Digest. Conference Edition. 1988 OSA Technical Digest Series vol. 2 (IEEE Cat. No. 98CH36177), pp. 75-76.

Weiner, "Femtosecond Optical Pulse Shaping and Processing," Prog. Quant. Electr. 1995, vol. 19, pp. 161-237.

* cited by examiner

METHODS AND SYSTEMS FOR POLARIZATION CONTROL AND POLARIZATION MODE DISPERSION COMPENSATION FOR WIDEBAND OPTICAL SIGNALS

CROSS-REFERENCE TO RELATED APPLICATION

This application claims priority to provisional patent application Ser. No. 60/206,863 by Andrew M. Weiner filed May 24, 2000, the contents of which are incorporated herein by reference.

BACKGROUND

This invention relates to optical communications and the processing of optical signals. More particularly, the invention relates to optical processing methods and systems that address polarization effects such as polarization mode dispersion (PMD) and polarization dependent loss (PDL).

The transmission of information over optical fibers is becoming pervasive. This is motivated, at least in part, because optical fiber offers much larger bandwidths than electrical cable. Moreover, optical fiber can connect nodes over large distances and transmit optical information between such nodes at the speed of light. Among factors limiting transmission rates and distances in high-speed fiber systems, however, are polarization effects such as polarization mode dispersion (PMD) in optical system such as optical fiber.

Polarization-mode dispersion arises from small random birefringences in optical fibers. For sufficiently short sections of fiber, the birefringence may be considered uniform, and light traveling along the fast and slow axes of the fiber experiences different propagation delays. For longer sections of fiber, however, the orientation and amplitude of the birefringence varies, leading to a phenomenon called polarization-mode coupling which eventually randomizes the polarization state of the propagating lightwave. The fiber length over which the polarization state is randomized is known as the correlation length $L_c$. Typical lengths for $L_c$ range from meters to perhaps a few hundreds of meters. Therefore, high-speed fiber transmission systems, with lengths ranging from tens of kilometers to thousands of kilometers, are long compared to the correlation length.

In this long fiber limit, one may model a fiber as a series of wave plates with random orientations of fast and slow axes. Any single wave plate is characterized by the differential delay $\delta\tau$ between its two axes. For a large number of wave plates, N, the total delay is a random variable whose statistics are governed by a random walk process. Therefore, the variance of the delay scales as $\delta\tau\sqrt{N}$. For this reason, one measure of PMD is in units of ps km$^{-0.5}$. Modern high quality fibers may have PMD coefficients below 0.1 ps km$^{-0.5}$. On the other hand, much older embedded fiber has much higher PMD, which can be on the order of several ps km$^{-0.5}$ or higher. In such a fiber, PMD will cause severe impairments at 10 Gb/s in fiber spans of only 100 km.

Much research on PMD in lightwave systems focuses on PMD-related timing shifts and pulse broadenings significantly below the bit period, because in the absence of PMD compensation, this is the only regime where high quality communications is possible. In these situations PMD may be understood in the "high coherence" limit, where the coherence time of the lightwave signal exceeds the PMD-related broadening. In this limit the leading effect is termed first-order PMD. In the first order PMD picture, there exists a pair of orthogonal, input principal states of polarization (PSPs) for which the output polarization does not change with frequency (to first order). These PSPs correspond to the fastest and slowest propagation through the fiber, respectively. The differential group delay (DGD) between the two PSPs is denoted $\Delta\tau$. Both the PSPs and $\Delta\tau$ are random variables. The PMD can be represented compactly by introducing a polarization dispersion vector $$\vec{\Omega} = \Delta\tau\, \vec{s} \tag{1}$$

whose magnitude gives the DGD and whose direction $\vec{s}$ is a unit vector in the Poincare sphere representation specifying the orientation of the PSPs. In the first order limit, pulse broadening and distortion due to PMD can be described in terms of the output signal being split into two replicas with relative delay $\Delta\tau$. Characterizing PMD in terms of a coefficient with units ps km$^{-0.5}$ actually refers to $<\Delta\tau>$, the statistical mean of $\Delta\tau$.

In the first-order PMD limit, compensation can be accomplished by using a polarization controller and polarization beam splitter to separate the fiber output into the two PSPs, passing one of the separated beams into a variable delay stage, and then recombining the two beams with a relative delay opposite to the DGD. Compensating for higher-order PMD, however, is clearly more difficult.

Another polarization effect that can limit performance of high-speed fiber systems is polarization dependent loss (PDL) and polarization dependent gain (PDG). PDL arises in passive devices wherein the loss is polarization dependent. PDG arises in optical amplifiers where the gain is polarization dependent. In either case, the polarization effects lead to intensity fluctuations in the fiber system, which degrade performance. Moreover, like PMD, these polarization effects typically vary with lightwave frequency.

SUMMARY

Applicant has recognized that higher-order polarization effects in wideband lightwave signals can be compensated by spatially dispersing the frequency components of the lightwave signal and independently adjusting one or more properties of the spatially dispersed frequency components (e.g., state of polarization (SOP), phase, and/or amplitude) to reduce the polarization effects and thereby improve signal bandwidth and performance. For example, a liquid-crystal spatial light modulator may be used to independently adjust the properties of the spatially dispersed frequency components. The methods and systems described herein can be applied to correct higher-order PMD by expanding the dispersion vector $\vec{\Omega}$ in a Taylor series expansion with respect to frequency and compensating for the higher order terms. Moreover, when the Taylor expansion is not appropriate, the methods and systems can be applied to correct PMD by addressing the full wavelength dependence of PMD.

In general, in one aspect, the invention features an optical processing method including: receiving an optical signal from an optical system, wherein the optical signal is distorted by frequency-dependent polarization effects in the optical system; spatially dispersing frequency components of the distorted optical signal on a spatial light modulator (SLM); and independently adjusting the polarization transfer matrix of multiple regions of the SLM to reduce the distortion of the optical signal.

Embodiments of this optical processing method may further include any of the following features.

The method can further include monitoring the frequency-dependent polarization effects from the optical system. Furthermore, the adjustments by the spatial light modulator can be in response to the monitoring of the frequency-dependent polarization effects.

The adjustments to the polarization transfer matrix can be selected to cause independent adjustments to the phase and the state of polarization (SOP) of each of multiple subsets of the spatially dispersed frequency components. For example, the frequency-dependent polarization effects can include polarization mode dispersion (PMD), and the adjustments caused by the SLM can at least partially compensate for the PMD.

The adjustments can be selected to cause the state of polarization (SOP) of at least some of the frequency components to be substantially the same. Furthermore, the adjustments can be selected to cause the delay of these frequency components to be substantially the same. Equivalently, the adjustments can be selected to cause the phase of these frequency components to vary substantially linearly with frequency, including the case where the phase of these frequency components are caused to be substantially the same. In some embodiments, such adjustments are applied to all of the spatially dispersed frequency components.

The distortions can include broadening of mean pulse duration in the optical signal, and the adjustments can be selected to reduce the broadening caused by the optical system.

In general, in another aspect, the invention features an optical processing method including: providing a precompensation signal indicative of frequency-dependent polarization effects in a downstream optical system; spatially dispersing frequency components of an optical signal on a spatial light modulator (SLM); and independently adjusting the polarization transfer matrix of multiple regions of the SLM to at least partially precompensate the optical signal for distortions caused by the frequency-dependent polarization effects in the downstream optical system.

Embodiments of this optical processing method may further include any of the following features.

The frequency-dependent polarization effects can include polarization mode dispersion (PMD) effects that define wavelength-dependent principle states of polarization (PSP) in the downstream optical system, and the adjustments can be selected to align the state of polarization of at least some of the spatially dispersed frequency components with the wavelength-dependent PSP in the downstream optical system. In some embodiments, such adjustments are applied to all of the spatially dispersed frequency components.

The adjustments to the polarization transfer matrix can be selected to cause independent adjustments to the phase and the state of polarization (SOP) of each of multiple subsets of the spatially dispersed frequency components. For example, the frequency-dependent polarization effects can include polarization mode dispersion (PMD), and the adjustments caused by the SLM can at least partially precompensate for the PMD.

The adjustments can be selected to cause the state of polarization (SOP) of at least some of the frequency components to be substantially the same following transmission through the downstream optical system. Furthermore, the adjustments can be selected to cause the delay of the at least some of the frequency components to be substantially the same following transmission through the downstream optical system. Equivalently, the adjustments can be selected to cause the phase of these frequency components to vary substantially linearly with frequency following transmission through the downstream optical system, including the case where the phase of these frequency components are caused to be substantially the same. In some embodiments, such adjustments are applied to all of the spatially dispersed frequency components.

The distortions can include broadening of mean pulse duration in the optical signal, and the adjustments can be selected to reduce the broadening caused by the downstream optical system.

The frequency-dependent polarization effects can include frequency-dependent polarization dependent loss (PDL), and the adjustments can be selected to align the state of polarization (SOP) of at least some of the spatially dispersed frequency components with the frequency-dependent axis that minimizes loss from the frequency-dependent PDL. In some embodiments, such adjustments are applied to all of the spatially dispersed frequency components.

The former of the two optical processing methods relates to post-compensation of the frequency-dependent polarization effects, whereas the latter of the two methods relates to pre-compensation. Embodiments of either of the optical processing methods may have any of the following features.

The method can further include using the SLM to selectively vary the intensity of at least some of the spatially dispersed frequency components. Also, the optical system can include at least one optical fiber.

In general, in another aspect, the invention features a method for emulating transmission of an optical signal through an optical system having frequency-dependent polarization effects, the method including: providing a model of the frequency-dependent polarization effects; spatially dispersing frequency components of the optical signal on a spatial light modulator (SLM); and independently adjusting the polarization transfer matrix of multiple regions of the SLM based on the model to emulate the optical signal transmission. In some embodiments, the frequency-dependent polarization effects include polarization mode dispersion (PMD) effects. The model of the PMD effects may be selected to have statistics that similar those of an optical fiber having PMD. Alternatively, the model of the PMD effects may be selected to have statistics that differ from those of an optical fiber having PMD.

Embodiments of any of the three methods described above may have any of the following features.

The method can further include recombining the spatially dispersed frequency components following the adjustments by the spatial light modulator.

The frequency dependent polarization effects can cause wavelength dependent changes in the state of polarization (SOP) of the optical signal. For example, the frequency-dependent polarization effects can include polarization mode dispersion effects. Such polarization mode dispersion effects can be represented by a frequency-dependent polarization transfer matrix characterized by a frequency-dependent differential delay and principal states of polarization.

The optical signal can occupy all of the frequency components, e.g., as a high-bandwidth pulsed signal. Alternatively, the optical signal can include multiple signals on separate wavelength bands, e.g., a wavelength-division multiplexed signals.

The spatial dispersion of the frequency components can include using a grating, a prism, an arrayed waveguide grating, or a virtually imaged phase array.

The spatial light modulator can include at least one liquid crystal layer. For example, the spatial light modulator can include at least two liquid crystal (LC) layers, wherein the LC molecules in each of the LC layers are oriented along an axis, and wherein the axis for one of the LC layers is different from the axis of another of the LC layers. In some embodiments, the axes differ from one another by an absolute amount of about 45 degrees, e.g., the absolute amount is in the range of 42 degrees to 48 degrees. The spatial light modulator can also include at least three layers. For example, in some embodiments, the orientation axis of a first of the LC layers differs from the orientation axis of a second of the LC layer by absolute amount of about 45 degrees, and wherein the orientation of the second of the LC layers differs from the orientation axis of a third of the LC layers by an absolute amount of about 45 degrees.

The adjustments to the polarization transfer matrix can be selected to cause an adjustment to at least one of the phase, state of polarization (SOP), and amplitude of each of multiple subsets of the spatially dispersed frequency components. Similarly, the adjustments to the polarization transfer matrix can be selected to cause an adjustment to at least one of the phase and the state of polarization (SOP) of each of multiple subsets of the spatially dispersed frequency components. Similarly, the adjustments to the polarization transfer matrix can be selected to cause an adjustment to the state of polarization (SOP) of each of multiple subsets of the spatially dispersed frequency components. Furthermore, the adjustments to the polarization transfer matrix can be selected to cause independent adjustments to the phase and the state of polarization (SOP) of each of multiple subsets of the spatially dispersed frequency components.

The adjustments can also be selected to independently delay a selected polarization component of each of multiple subsets of the spatially dispersed frequency components.

In general, in another aspect, the invention features an optical processing system for reducing a distortion in an optical signal transmitted through an optical system having frequency-dependent polarization effects. This optical processing system includes: a dispersive module positioned to receive the optical signal and spatially separate frequency components of the optical signal; a spatial light modulator (SLM) having multiple regions with an independently adjustable polarization transfer matrix, the SLM positioned to receive the spatially separated frequency components on the multiple regions; and a controller coupled to the SLM, wherein during operation the controller causes the SLM to independently adjust the polarization transfer matrix of the multiple regions to reduce the distortion of the optical signal.

In general, in another aspect, the invention features an optical processing system for at least partially precompensating an optical signal for frequency-dependent polarization effects in a downstream optical system. This optical processing system includes: a dispersive module positioned to receive the optical signal and spatially separate frequency components of the optical signal; a spatial light modulator (SLM) having multiple regions with an independently adjustable polarization transfer matrix, the SLM positioned to receive the spatially separated frequency components on the multiple regions; and a controller coupled to the SLM and configured to receive a precompensation signal indicative of the frequency-dependent polarization effects in the downstream optical system, wherein during operation the controller responds to the precompensation signal by causing the SLM to independently adjust the polarization transfer matrix of the multiple regions to at least partially precompensate the optical signal for distortions caused by the frequency-dependent polarization effects.

In general, in another aspect, the invention features an optical emulator system for emulating transmission of an optical signal through an optical system having frequency-dependent polarization effects. The emulator includes: a dispersive module positioned to receive the optical signal and spatially separate frequency components of the optical signal; a spatial light modulator (SLM) having multiple regions with an independently adjustable polarization transfer matrix, the SLM positioned to receive the spatially separated frequency components on the multiple regions; and a controller coupled to the SLM, wherein during operation the controller causes the SLM to independently adjust the polarization transfer matrix of the multiple regions to emulate the optical signal transmission based on a model of the frequency-dependent polarization effects.

These three systems correspond to the three methods described above, respectively. Embodiments of any of these systems may further include any of features described above for the corresponding method.

The details of multiple embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
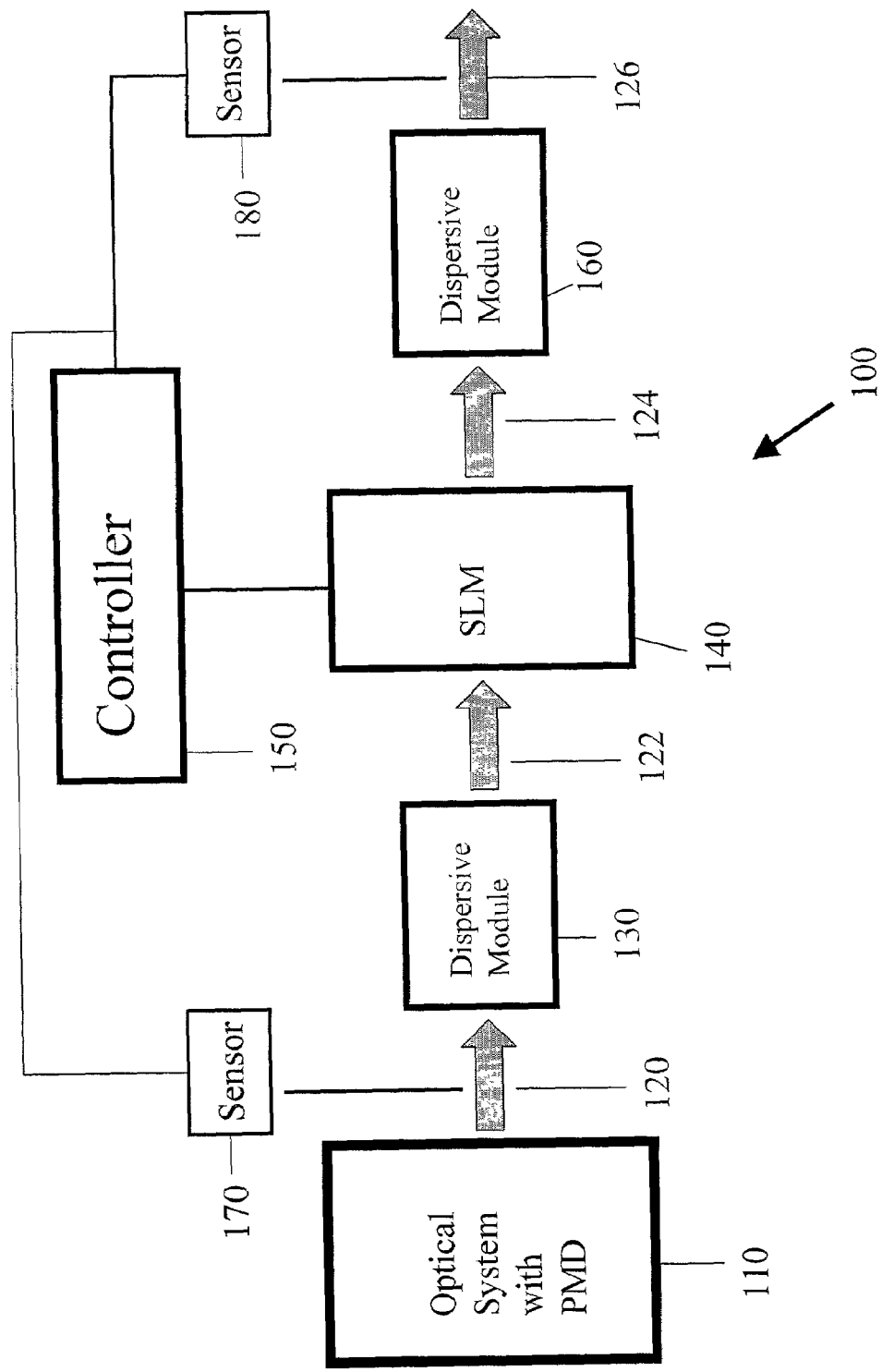
FIG. 1 is a schematic diagram of a compensation system for reducing distortions in a lightwave signal caused by transmission through an optical system having frequency dependent polarization effects.

FIG. 1 shows a schematic diagram of a compensation system 100 for reducing distortions in a lightwave signal 120 caused by transmission through an optical system 110 having frequency-dependent polarization effects. Compensation system 100 includes a first dispersive module 130, a spatial light modulator (SLM) 140, a controller 150 coupled to spatial light modulator 140, and a second dispersive module 160. Dispersive module 130 spatially separates signal 120 into its frequency components 122 and directs the spatially separated frequency components 122 onto an active area of spatial light modulator 140. Thereafter, controller 150 causes spatial light modulator 140 to independently adjust one or more properties (e.g., state of polarization (SOP), phase, and/or amplitude) of different subsets of spatially separated frequency components 122 to produce adjusted, spatially separated frequency components 124. Dispersive module 160 then spatially recombines adjusted frequency components 124 to produce compensated lightwave signal 126. The effect of compensation system 100 is to reduce the distortions in the lightwave signal caused by transmission system 110.

In some embodiments, controller 150 controls SLM 140 based at least in part on a feedforward detection signal from detection system 170, which samples a portion of lightwave signal 120 to characterize the distortion caused by optical system 110. Alternatively, in other embodiments, controller 150 controls SLM 140 based at least in part on a feedback detection signal from detection system 180, which samples a portion of compensated lightwave signal 126 to characterize the effective reduction in the distortion. Furthermore, in additional embodiments, controller 150 controls SLM 140 based at least in part on signals from both detection systems 170 and 180. In yet further embodiments, controller 150 controls SLM 140 based at least in part on a remote control signal or, for example, some preprogrammed schedule.

Optical system 110 can include a distance of optical fiber having frequency-dependent polarization effects such as PMD. Optical system 110 can also include additional optical components, e.g., laser sources, amplifiers, switches, couplers etc., which can also have frequency-dependent polarization effects. Optical system 110 produces distortions in lightwave signal 120 that, absent compensation, limit the bandwidth and/or fidelity of the lightwave system as a whole. For example, PMD causes pulse-broadening distortions, which absent compensation, set an upper limit for the bit rate period because of intersymbol interference. In such cases, the purpose of compensation system 100 is to reduce the distortions, and preferably, to optimize the usable bandwidth of lightwave signal 120.

For example, PMD can be represented by a Taylor expansion of the polarization dispersion vector in terms of optical frequency:

$$\vec{\Omega}(\omega) = \Delta\tau_o \vec{s}_o + \left[\frac{\partial \Delta\tau}{\partial \omega}\vec{s}_o + \Delta\tau_o \frac{\partial \vec{s}}{\partial \omega}\right]\Delta\omega + \ldots \quad (2)$$

Second order PMD is represented by the terms within the brackets. The first term, a variation of DGD with frequency, is a polarization dependent chromatic dispersion. It has opposite signs for the two PSPs. The second term represents a rotation of the PSPs and leads to depolarization and polarization dependent distortion. Statistically, its effect is nearly an order of magnitude larger than that of the polarization dependent chromatic dispersion.

Some embodiments of compensation system 100 reduce PMD distortions in optical signal 120 by adjusting the phase and state of polarization (SOP) of the spatially dispersed frequency components to cancel the effects induced by the polarization dispersion vector, e.g., to first and second order in the Taylor expansion.

Moreover, when the frequency bandwidth of optical signal 120 is too broad to model the PMD in optical system 110 as a Taylor expansion, compensation system 100 can address the arbitrary wavelength-dependent output polarization states and phases caused by PMD. This is possible because dispersive module 130 and spatial light modulator 140 permit compensation system 100 to manipulate the spectrum on a wavelength-by-wavelength basis. In general, the electric field of lightwave signal 120 following transmission through optical system 110 can be expressed as $$E_{out}(\omega) = |E_{in}(\omega)|\{a(\omega)\hat{\alpha} + b(\omega)\hat{\beta}\} \quad (3)$$

where $\hat{\alpha}$ and $\hat{\beta}$ are orthogonal polarization bases and $a(\omega) = |a(\omega)|e^{i\psi a(\omega)}$ and $b(\omega) = |b(\omega)|e^{i\psi b(\omega)}$ are complex, frequency-dependent coefficients. For narrowband signals where first and second order PMD effects dominate, it makes sense to define $\hat{\alpha}$ and $\hat{\beta}$ to coincide with the PSPs at the center frequency. However, for broadband signals where the frequency variation completely randomizes the PSPs, the polarization bases can be chosen arbitrarily. For convenience we simply take $\hat{\alpha}=\hat{x}$ and $\hat{\beta}=\hat{y}$, respectively. Furthermore, the expression in Equation 3 is general enough to describe additional frequency-dependent polarization effects such as PDL, whose distortive effects may also be reduced by compensation system 100. As described in greater detail below, in many embodiments, the job of spatial light modulator 140 is to adjust $a(\omega)$ and $b(\omega)$ to obtain a flat phase and a constant polarization across the entire spectrum, which would restore the initial bandwidth-limited pulse duration and constitute complete compensation for the PMD imparted by optical system 110. Alternatively, the SLM can adjust $a(\omega)$ and $b(\omega)$ to obtain a constant polarization across the entire spectrum and a phase that varies linearly with frequency, which would likewise restore the initial bandwidth-limited pulse duration because the linear phase variation causes only a constant delay over the entire spectrum. In other words, the linear phase variation produces a frequency-dependent delay that is constant, and thus there is no differential delay between respective frequency components. In addition, the SLM can variably attenuate $a(\omega)$ and $b(\omega)$ across the spectrum to compensate for PDL in optical system 110.

Although the preceding and subsequent paragraphs may refer to compensation of pulse broadening caused by PMD, it is noted that lightwave signals 120 and 126 may carry such pulse information on one or more different wavelength bands. Thus, in one limit, the entire frequency bandwidth of the lightwave signal may be used to carry high-bandwidth, pulsed information (e.g., time-domain multiplexing), whereas, in the opposite limit, the frequency bandwidth of the lightwave signal is divided into separate wavelength bands, each simultaneously carrying lower-bandwidth pulsed information (e.g., wavelength-division multiplexing).

The dispersive modules 130 and 160 can include any dispersive element for spatially separating frequency components. For example, they can include a diffraction grating (e.g., a reflective grating, transmissive grating, an amplitude grating, a phase grating, a holographic grating, echelle grating, arrayed-waveguide grating), a chromatic prism, and/or a virtually imaged phased array (VIPA). VIPAs are described in, for example, M. Shiraski, Opt. Lett., 21, 366 (1996) and Shiraski et al., IEEE Phot. Tech. Lett. 11, 1443 (1999). The dispersive modules may further include one or more imaging optics (e.g., lenses, mirrors, apertures, etc.) for directing the frequency components spatially separated by the dispersive element in module 130 onto SLM 140 or for directing the adjusted frequency components from SLM 140 to the dispersive element in module 160. Moreover, in additional embodiments, the dispersive module can be a single optical element that combines the dispersing and directing functions, e.g., the dispersive module can be a diffractive optical element (DOE).

Dispersive module 130 spatially separates signal 120 into frequency components 122 and directs them onto an active area of SLM 140. After SLM 140 adjusts the properties of the spatially dispersed frequency components, dispersive module 160 recombines the adjusted spatially dispersed frequency components to form adjusted lightwave signal 126. As used herein, an SLM is any component or aggregation of components that defines an active area having multiple, addressable regions for adjusting the SOP, phase, and/or amplitude of light wavefronts incident on the regions. For example, the SLM can have multiple, independently addressable regions such as a discrete array of independently addressable pixels. Alternatively, the SLM can have multiple, addressable regions that partially overlap. For example, the SLM can be a deformable mirror having multiple, addressable actuators that deform overlapping regions of the active area. Furthermore, to change phase and/or SOP, for example, the SLM can vary the retardance of a selected polarization component (e.g., a tunable waveplate). In the embodiment shown in FIG. 1, SLM 140 is electronically addressable through its connection with controller 150. In other embodiments, however, the SLM may be optically addressable. Dispersive module 130 directs frequency components 122 onto the multiple regions of SLM 140 so that there is a known relationship between each addressable region and the particular frequency component or frequency components incident on that region.

The SLM can adjust the SOP, phase, and/or amplitude of the incident frequency components by, e.g., reflection, transmission, diffraction, or some combination thereof. As described further below, in many embodiments, the SLM involves one or more liquid crystal layers, whose birefringence and/or orientation are controlled to provide a desired series of adjustments for each SLM pixel. For example, the liquid crystal SLM may include twisted nematic liquid crystals, non-twisted nematic liquid crystals, and/or ferroelectric liquid crystals. In further embodiments, the SLM can include an inorganic electro-optic modulator, e.g., a lithium niobate crystal coupled to a generator providing a spatially addressable E-field, or an acousto-optic modulator coupled to a transducer providing a spatially addressable acoustic wave.

Ideally, SLM 140 provides independent control over each of SOP, phase, and amplitude (i.e., variable attenuation) for each pixel or region of the SLM. In such cases, SLM 140 can adjust $a(\omega)$ and $b(\omega)$ in Equation (3) to compensate for frequency dependent PMD and PDL for each of the frequency component subsets incident on a pixel of the SLM. The variable attenuation may also be useful as a spectral band equalizer. If only PMD is to be addressed, it is sufficient for the SLM to have independent control of over both SOP and phase for each pixel or region of the SLM. Thus, in such cases, dispersive module 130 and SLM 140 combine to function as a programmable spectral phase and polarization equalizer by independently adjusting the polarization state and phase of lightwave signal 126 on a wavelength-by-wavelength basis. The approach allows compensation of time-varying PMD effects, at least down to the response time of the SLM. For nematic liquid crystal SLMs, this response time is on the order of tens of milliseconds, which is fast enough to handle the majority of environmental effects that cause PMD to vary.

It is worth remarking on the relationship between delay and spectral phase. For complete phase control, the SLM only needs to vary phase at each pixel over a 0-2π radian range, which by itself constitutes a small phase delay. The frequency dependent group delay, however, varies as the derivative of phase with respect to frequency. In particular, frequency dependent delay $\tau(\omega)$ is related to a spectral phase variation $\psi(\omega)$ as shown in Equation 4:

$$\tau(\omega) = -\frac{\partial \psi(\omega)}{\partial \omega} \quad (4)$$

Therefore, even relatively large group delays that may be associated with PMD, e.g., in the tens of picoseconds range, can be compensated using physical phase delays no larger than 2π. For visible and near infrared wavelengths, such phase delays correspond to a physical phase delay of only a few femtoseconds.

The SLM can compensate for PMD using the general approach associated with adjusting $a(\omega)$ and $b(\omega)$ in Equation (3). Formally, the adjustments caused by each pixel of the SLM can be expressed as a polarization transfer matrix (also known as a "Jones" Matrix) M. Because dispersive module 130 maps frequency components onto the different pixels of SLM 140, the effective polarization transfer matrix of the SLM becomes frequency dependent M(ω), and thus the electric field $E_{adjusted}(\omega)$ of adjusted lightwave signal 126 following transmission through compensation system 100 can be expressed as:

$$E_{adjusted}(\omega) = M(\omega) \cdot E_{out}(\omega) \quad (5)$$

where $E_{out}(\omega)$ is the electric field of distorted lightwave signal 120 as given by Equation (3). Matrix M is a 2-by-2 Hermitian matrix, thus it has four degrees of freedom and its elements may take on complex values. When each pixel of SLM independently controls all four degrees of freedom of the polarization transfer matrix, the SLM can independently control the SOP, phase, and attenuation of the spatially dispersed frequency components, and thereby completely compensate for the frequency-dependent polarization effects imparted by optical system 110. Even when the pixels of the SLM control less than all four of the degrees of the polarization transfer matrix, the distortions caused by optical system 110 can be reduced, if not completely compensated. As described above, for example, independent control over SOP and phase (e.g., three degrees of freedom) by each pixel of the SLM is sufficient to completely compensate for PMD distortions.

Moreover, even when the pixels of the SLM provide less than complete control over SOP and phase, PMD distortions can still be reduced. For example, when the SLM only provides phase control, that phase control can be used to compensate for the chromatic dispersion part of the PMD distortion. Similarly, when the SLM only provides control over only SOP, the frequency-dependent polarization rotation part of PMD can be compensated. Often such polarization rotation provides the dominant contribution to the distortions in lightwave signal 120. In general, a reduction in the PMD distortion can be manifest by a reduction (as opposed to elimination) of the mean signal broadening caused by the PMD distortion. Specific examples of SLMs having one or more degrees of freedom for controlling SOP, phase, and/or amplitude are described further below.

Even where individual pixels of the SLM provide many degrees of control over incident frequency components, the maximum amount of PMD that can be compensated or reduced is limited by the spectral resolution of compensation system 100. Generally, the parameters of dispersive module 130 are selected to fully exploit the entire pixel array of SLM 140. In other words, one tries to minimize the range of frequency components on any one pixel while also insuring that all frequency components of interest are incident on at least one pixel. Accordingly, spectral resolution can be made to scale with the number of independently addressable pixels on the SLM. For example, the SLM may have, e.g., at least 2, 4, or 8 pixels, and preferably many more, e.g., 64, 128, etc. In any case, to avoid aliasing, spectral variations in the distorted signal should be slow compared to the frequency width, denoted δf, of one SLM pixel. This is equivalent to the requirement that the total duration of the signal to be compensated should be significantly below ½δf. The situation may be modified somewhat for embodiments in which the distorted lightwave signal includes multiple signals on separate wavelength bands. In this case, the dispersive modules and SLM can be tailored to optimize spectral resolution within each band, whereas regions between separate bands may be ignored. Thus, the SLM can have multiple sets of pixel arrays, each of which is dedicated to a particular wavelength band.

Figure 2:
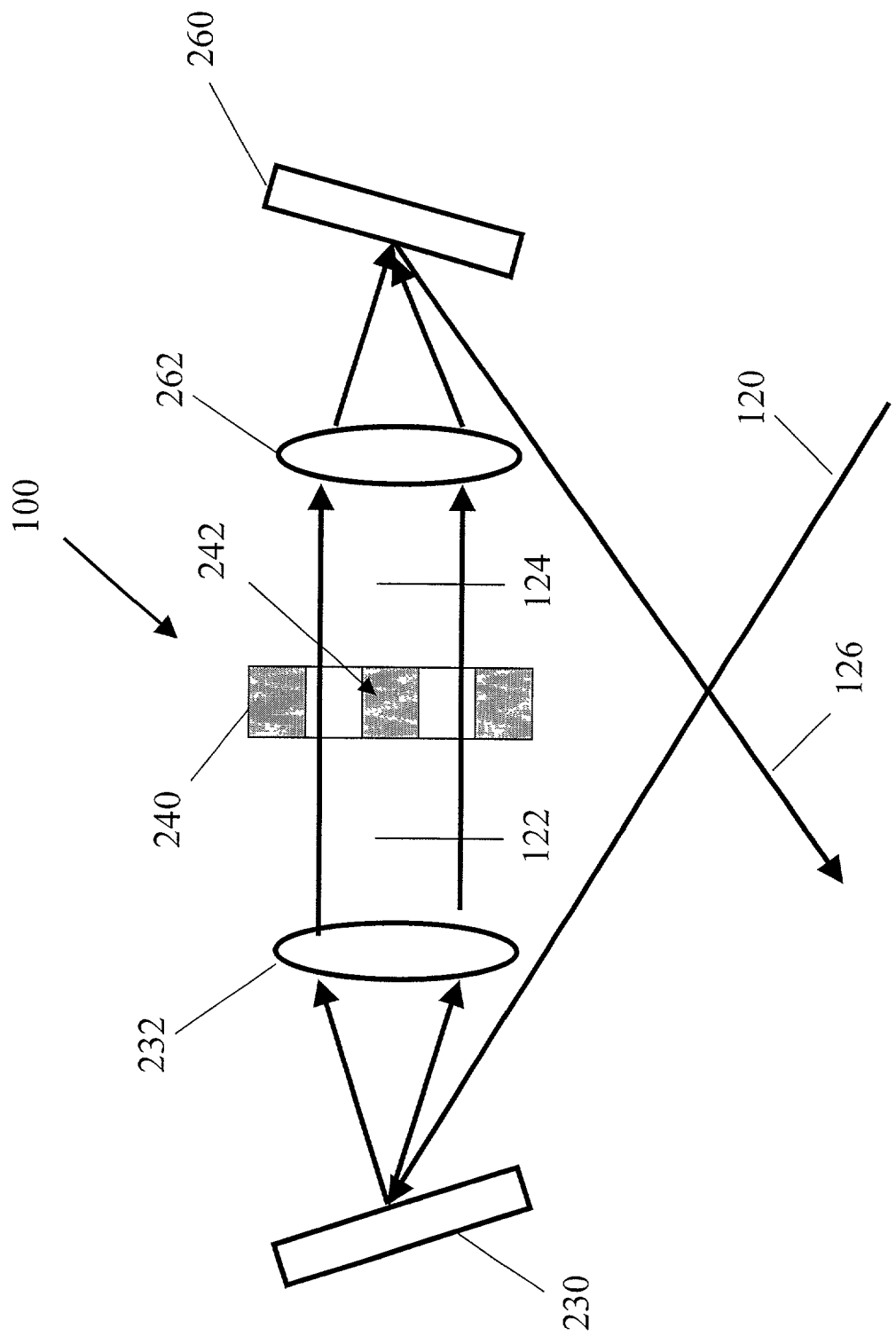
FIG. 2 is a schematic diagram of a particular embodiment of the compensation system.

Referring to FIG. 2, one embodiment of compensation system 100 is shown. In this embodiment, the first dispersive module includes a first grating 230 for receiving lightwave signal 120 and angularly dispersing its components according to frequency and a first lens 232 for collimating the angularly dispersed frequency components and focusing the individual frequency components onto a one-dimensional array of pixels 242 of an SLM 240. The collimation and focusing can be accomplished by spacing lens 232 from each of grating 230 and SLM 240 by a distance equal to its focal length. Thus, the grating and lens map the frequency content of lightwave signal 120 onto the SLM pixel array. Moreover, because of the positioning of the lens, grating, and SLM, the spatial extent of any individual frequency component on the pixel array is minimized. For each pixel, SLM 240 independently adjusts one or more properties of the frequency components incident on the pixel. The second dispersive module includes a second grating 260 and a second lens 262 for recombining the adjusted spatially separated frequency components 124 into adjusted lightwave signal 126. Like the first dispersive module of FIG. 2, lens 262 is spaced from each of SLM 240 and grating 260 by a distance equal to its focal length. In the embodiment shown in FIG. 2, the focal length of lenses 232 and 262 are the same ("F"), and thus the gratings, lenses, and SLM define a "4-F" arrangement. The diffraction efficiencies of gratings 230 and 260 are preferably polarization insensitive, otherwise the gratings themselves affect the polarization properties of the lightwave signals. Alternatively, the SLM can compensate for the polarization sensitive diffraction efficiencies of the gratings.

In other embodiments, for example, the lenses 232 and 262 can be replaced with curved mirrors having a radius of curvature equal to 2F, in which case the arrangement is folded. Similarly, the arrangement can be folded by using a reflective SLM. Also, transmission gratings may be used instead of the reflective gratings shown in FIG. 2. Moreover, in additional embodiments, the dispersive modules and SLM may be implemented, in whole or in part, as an integrated waveguide structure.

Figure 3:
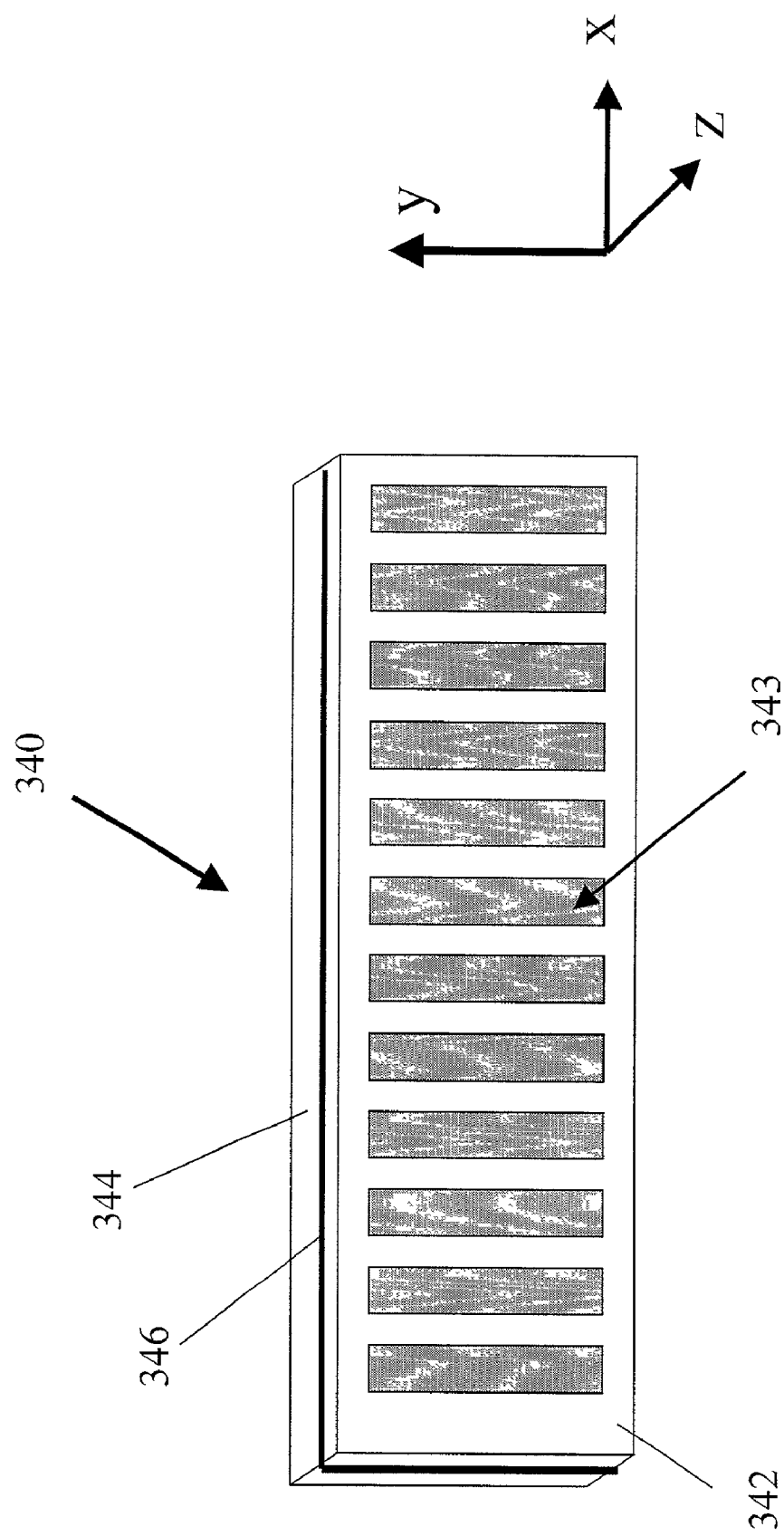
FIG. 3 is a perspective diagram of a liquid crystal (LC) spatial light modulator (SLM).

Referring to FIG. 3, a single layer liquid crystal (LC) SLM 340 is shown as one embodiment of SLM 240. SLM 340 includes a front glass plate 342, covered on one surface (e.g, the surface closest to the LC layer) by a transparent conducting material (e.g., indium tin oxide or "ITO"). The conducting material is lithographically patterned into a series of electrically isolated pixels 343, depicted as the vertical rectangles. SLM 340 further includes a back glass plate 344, covered uniformly on one surface by a second transparent conducting material (not shown), e.g., ITO, which is usually connected to electrical ground. A layer of nematic liquid crystals 346 is sandwiched between the two glass plates. The thickness of the liquid crystal layer is typically of order microns to tens of microns. Nematic LC molecules have a rod-like shape and during assembly of the modulator, they are aligned using standard techniques to have their long axis aligned in a prespecified direction. Under influence of an electric field applied between the electrodes of plates 342 and 344, the LCs can be rotated or otherwise realigned, which induces a change in phase or polarization of light passing through the device.

For example, consider a coordinate system wherein the x-axis extends along the pixel array, the y-axis extends perpendicular to x in the LC-layer plane, and the z-axis is perpendicular to the LC-layer plane. The long axes of LCs are aligned at each of the glass plates along a prespecified direction in the x-y plane. For example, for a non-twisted nematic LC layer, the long axes of the LCs are aligned along the same prespecified direction at each glass plate, e.g., along the y-axis. In such a case, when an electric field is applied across the LC layer in a given pixel, the long axes of the LCs within the volume defined by the pixel rotate toward the z-axis in the y-z plane. Associated with such rotation is a change in the refractive index seen by light polarized along the y-axis and propagating through the SLM (i.e., propagating along the z-axis). Thus, the polarization transfer matrix for each pixel in this case can be expressed as:

$$M = \begin{bmatrix} e^{i\phi_0} & 0 \\ 0 & e^{i\phi(V)} \end{bmatrix} \quad (6)$$

using the x-y basis, and where $\phi(V)$ is the phase retardance for y-polarized light which varies in response to voltage V being applied across the LC layer at the given pixel and $\phi_0$ is the voltage independent phase retardance for x-polarized light. Accordingly, such an SLM imparts a controllable phase shift to the y-component of incident frequency components at each pixel. If the frequency components are polarized entirely along the y-axis, the SLM controls the phase of those frequency components. If instead, the frequency components have polarization components along both the x- and y-axes, the SLM adjusts the SOP of the incident frequency components. In other embodiments where the long axes of the LCs in the LC layer were aligned within the x-y plane at angle θ to the y-axis, the polarization transfer matrix $M_\theta$ would be related to that given in Equation (6) by the corresponding rotation transformation:

$$M_\theta = R(\theta) \cdot M \cdot R^{-1}(\theta) \quad (7)$$

$$\text{where } R(\theta) = \begin{bmatrix} \cos\theta & -\sin\theta \\ \sin\theta & \cos\theta \end{bmatrix}$$

SLM 340 is an example of a single-layer LC SLM. In additional embodiments, however, SLM 240 can include multiple LC layers to provide additional degrees of freedom for the SLM. For example, multilayer LC SLMs can be made by combining multiple single-layer LC SLMs such that their pixel arrays align with one another. This can be accomplished by physically attaching the single-layer SLMs together, e.g., attaching adjacent glass plates together with optical cement. This can also be accomplished by optically coupling single-layer SLMs, e.g., optically imaging the output from one SLM pixel array as an input to another pixel array or by using a single-mode fiber to couple together multiple sets of compensation subsystems.

Furthermore, multilayer LC SLMs can be made by sandwiching multiple LC layers between glass plates having the appropriate electrode patterns. For example, a two-layer LC SLM can be constructed from front, middle, and back glass plates sandwiching a first LC layer between the front and middle plates, and a second LC layer between the middle and back plates. The front and back plates are patterned with mating electrode arrays and the middle plate is coated with a electrode on each of its sides to define a ground electrode for each of the LC layers. Other permutations of the electrode patterning follow in a straightforward manner.

For the case of multilayer LC SLMs using non-twisted nematic LCs, aligning the long axes of the LCs differently among at least some of the LC layers provides the additional degrees of freedom for each pixel. The series of aligned pixels from each individual LC layer defines the pixel for the multilayer LC SLM as a whole. The polarization transfer matrix for each pixel in the multilayer LC SLM is given by the matrix product of the corresponding pixels of the individual LC layers. Control over a particular pixel in the multilayer LC SLM as a whole is achieved by independently controlling the applied voltage to the corresponding pixel in each of the LC layers. The following two multilayer configurations for a non-twisted nematic multilayer LC SLM are particularly useful for PMD and PDL compensation.

One of the configurations is a two-layer nematic LC SLM with molecules in the first LC layer aligned along either the x- or y-axes, and molecules in the second LC layer aligned along either +45 degrees or −45 degrees with respect to the x-y axes. Provided that both LC layers allow at least 2 pi radians of adjustable retardation, the geometry makes it possible to achieve the following functionalities. First, the device can be programmed to take light with an arbitrary input polarization at each pixel and transform it into a linear polarization that is either plus or minus 45 degrees with respect to the alignment direction of the last LC layer it passes through. Thus, when such an SLM is used in compensation system 100, it can be used to compensate for frequency dependent changes in SOP and produce an adjusted lightwave signal 126 having a constant linear polarization across its spectrum. Second, the device can be programmed to take light with a linear input polarization along either the + or −45 degree directions and independently transform it as desired at each pixel into an arbitrary output polarization as desired. That is, linearly polarized input light, polarized at + or −45 degrees with respect to the alignment direction of the first LC layer it passes through, can be transformed into an arbitrary output polarization. This functionality can be exploited when using the LC SLM in compensation system 100 as a precompensator for frequency-dependent polarization effects in a subsequent optical system or when using the compensation system as an emulator for frequency-dependent polarization effects, both of which are described further below.

The other configuration is a three-layer LC SLM in which the LC molecules in the first LC layer are aligned along the x- or y-axis, the LC molecules in the second LC layer are aligned at + or −45 degrees to the x-axis, and the LC molecules in the third LC layer are aligned along the x- or y-axis. This configuration permits the following functionalities. First, the first two layers can be used to convert an arbitrary input polarization at each pixel into a fixed linear polarization aligned with the molecules of the third LC layer, which can then be used to independently adjust the phase at each pixel. Thus, the three-layer LC SLM can be used for independent polarization and phase control on a wavelength-by-wavelength, which as described above, can completely compensate for frequency-dependent PMD. The configuration can also be used in precompensation and emulation schemes (described further below) to transform a linear input polarization at each pixel into an arbitrary output SOP and an arbitrary output phase. Finally, the configuration can also be used to convert an arbitrary input SOP at each pixel into an arbitrary output SOP.

Clearly additional embodiments of these configurations include LC SLMs in which the alignment of the LCs in each LC layer of the SLM are rotated by the same amount, but the relative alignment between the different LC layers remains constant. More importantly, additional configurations are possible by adding additional LC layers. For example, by adding additional LC layers, an LC SLM can be constructed that converts an arbitrary input SOP at each pixel into an arbitrary output SOP and also controls the relative output phase among the different pixels. Furthermore, by introducing one or more polarizers between, or after, the LC layers, polarization rotation can be converted into variable attenuation. For example, U.S. Pat. No. 5,719,650 describes two-layer and four-layer LC SLMs incorporating polarizers to provide arbitary phase and attenuation control for one polarization component and two orthogonal polarization components, respectively. In any of the embodiments described above, one or more standard waveplates of fixed thickness can be integrated into the compensation system to provide a fixed, nearly wavelength independent polarization rotation whenever needed.

Referring again to FIG. 1, in those embodiments incorporating LC SLMs in SLM 140, controller 150 includes the power source and logic for independently applying the electric fields to each of the respective pixels in each LC layer of the LC SLMs described above. Suitable power sources and logic are commercially available, e.g., see Cambridge Research and Instrumentation (CRI) in Woburn Mass. Controller 150 can also store appropriate calibration curves for the different LC layers so that the voltage necessary to impart a desired retardance is known. Furthermore, controller 150 can include software or hardware that implement algorithms that determine the adjustments necessary to reduce the distortions in lightwave signal 120. Such algorithms follow from the polarization transfer matrix for each pixel and the principles described herein. The algorithms can be implemented in computer programs or dedicated integrated circuits using standard programming techniques.

As described further above, controller 150 may receive feedforward or feedback signals from detection systems 170 and 180, respectively, which characterize the distortions in the lightwave signal and guide the design of the appropriate filter. In relatively simple embodiments with few degrees of freedom, detection system 180 can monitor the mean pulse broadening in adjusted lightwave signal 126 and provide a detection signal indicative of that broadening to controller 150, which varies the adjustments imparted by SLM 140 to minimize the pulse broadening (e.g., vary the parameters associated with first and second order PMD). In more complex embodiments, one or both of detection systems 170 and 180 can spectrally characterize the respective lightwave samples to provide sensing to controller 150 for each of the spatially separated frequency components incident on SLM 140.

Preferably, one or both of detection systems 170 and 180 sense SOP and spectral phase on a wavelength-by-wavelength basis. For example, the wavelength-dependent SOP can be monitored using conventional polarimetry techniques in conjunction with a tunable wavelength filter. Alternatively, rather than such a serial approach, a parallel approach can be used to monitor SOP of all the wavelengths simultaneously. For example, a polarimeter array can be used in conjunction with a spectrometer to provide such functionality. Sensing of the spectral phase (or equivalently the frequency dependent delay $\tau(\omega)$) can be achieved by using spectral interferometry techniques, cross-correlation techniques, and/or self-referencing measurement techniques, such as frequency resolved optical gating. Such techniques are described in, e.g., L. Lepetit et al., J. Opt. Soc. Am. B. 12, 2467-2474 (1995), K. Naganuma et al., Opt. Lett. 15, 393-395 (1990), and R. Trebino et al., Rev. Sci. Instrum. 68, 3277-3295 (1997), respectively. $\tau(\omega)$ can also be computed from the wavelength-dependent output SOP and wavelength-dependent polarization dispersion vector $\vec{\Omega}(\omega)$. $\vec{\Omega}(\omega)$ in turn can be determined from measurements of the wavelength-dependent transfer matrix of the optical fiber or optical system, or from the wavelength-dependence of the SOP itself, as described in, e.g., C. Poole et al, J. Lightwave Technology 6, 1185-1190 (1988); B. Heffner, IEEE Photon, Technol. Lett. 4, 1066-1069 (1992); B. Heffner, IEEE Photon, Technol. Lett. 5, 814-817 (1993); R. Jopson, IEEE Photon, Technol. Lett. 11, 1153-1155 (1999).

Figure 4A:
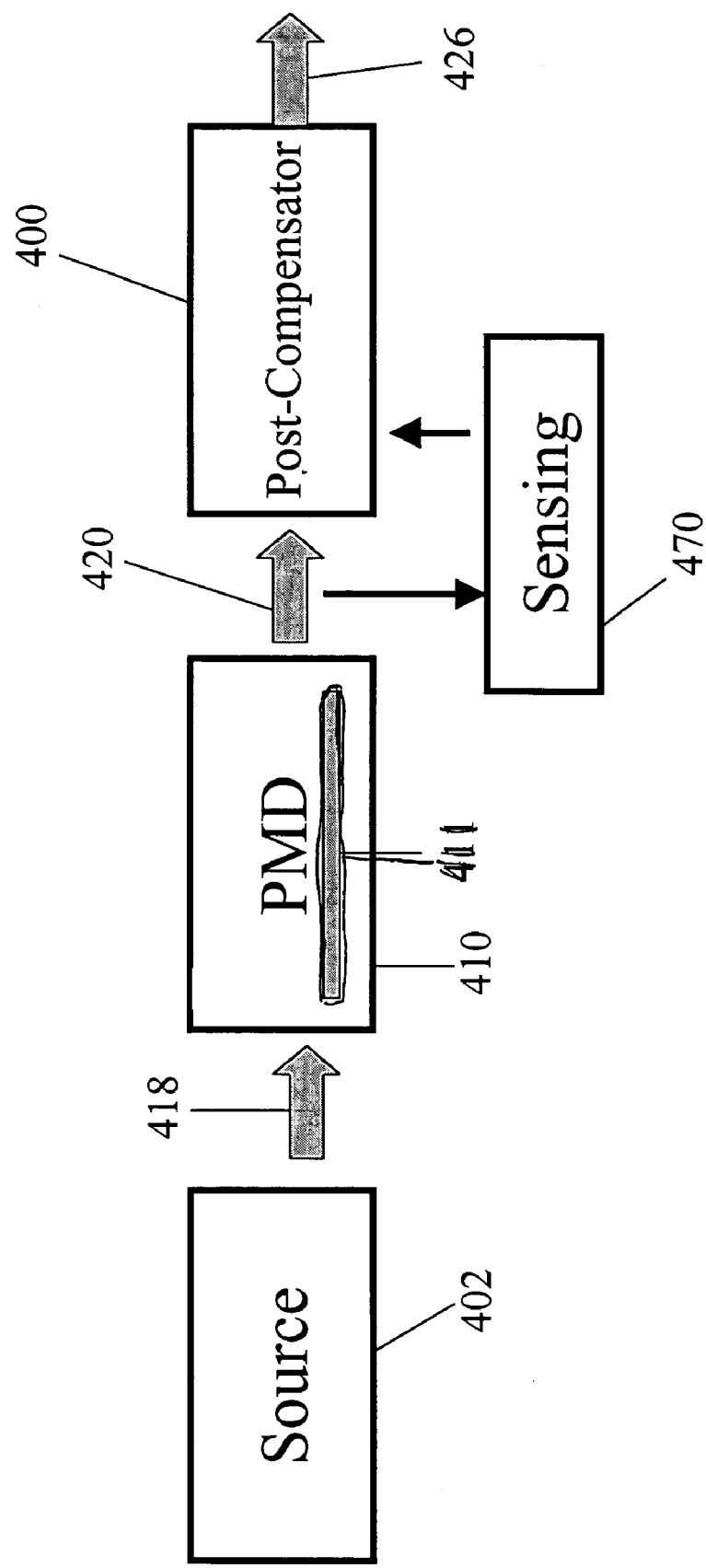
FIGS. 4a, 4b, and 4c are schematic diagrams showing implementations of the compensation systems for post-compensation (FIG. 4a), pre-compensation (FIG. 4b), and emulation (FIG. 4c).
Figure 4B:
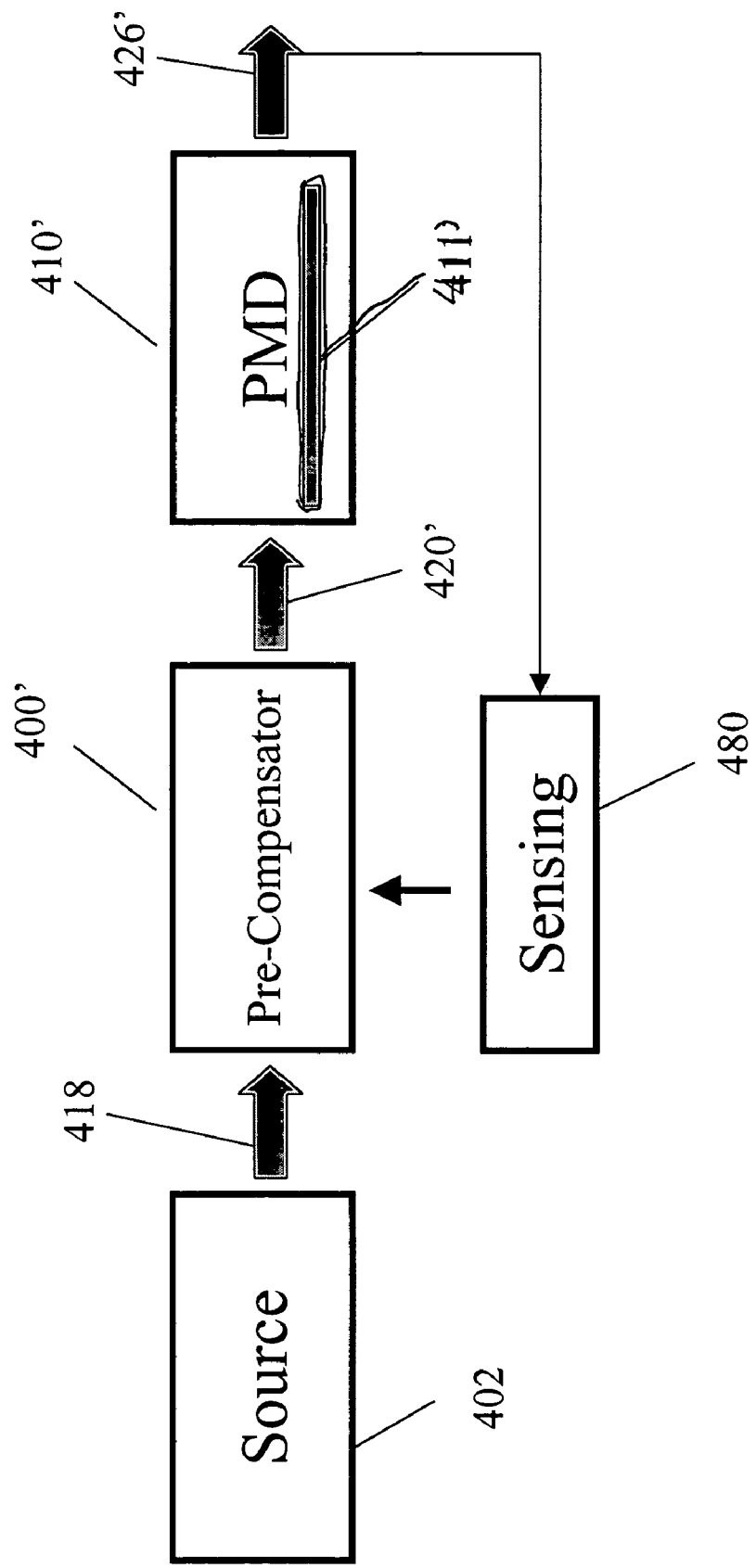
Figure 4C:
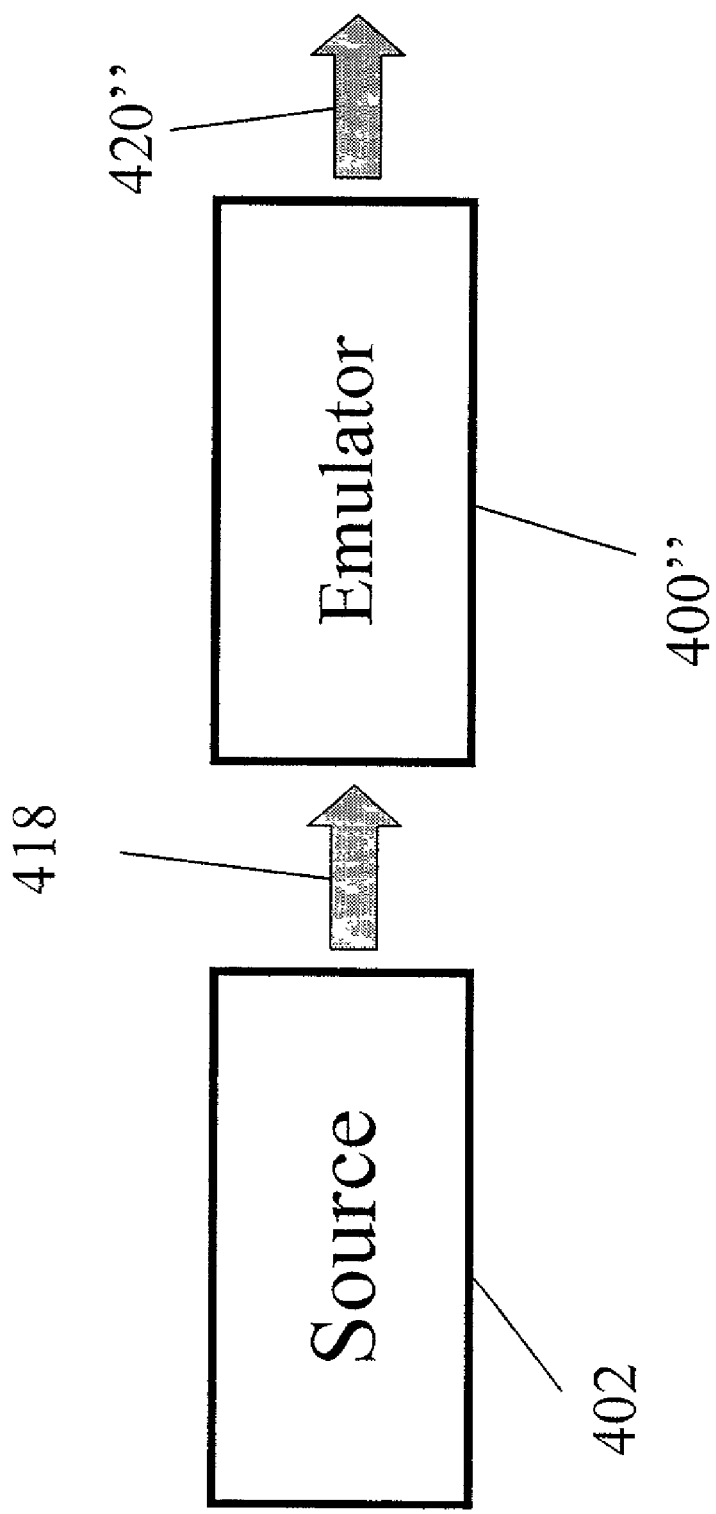

Compensation system 100 can also be implemented in configurations other than that shown in FIG. 1. In particular, rather than compensating or reducing distortions in a lightwave signal after it has passed through the optical system causing those distortions, system 100 can be used to precompensate a lightwave signal prior to its transmission through an optical system having frequency-dependent polarization effects. Furthermore, in addition to post-compensation and pre-compensation, system 100 can be used to emulate the output of an optical system having frequency-dependent polarization effects. FIGS. 4a-4c illustrate such implementations.

In particular, FIG. 4a shows a source 402 providing an undistorted lightwave signal 418, which passes through optical system 410 having PMD (e.g., caused by optical fiber 411) to produce distorted lightwave signal 420. Lightwave signal 420 then passes through PMD compensator 400 to reduce the distortions and produce adjusted lightwave signal 426. Compensator 400 is guided by sensing and control unit 470. This post-compensation implementation is thus analogous to that of FIG. 1.

FIG. 4b, on the other hand, shows a pre-compensation implementation. In particular, undistorted lightwave signal 418 first passes through precompensator 400', which produces predistorted lightwave signal 420'. Lightwave signal 420' then passes through optical system 410' having PMD (e.g., caused by optical fiber 411'). The predistortions in signal 420', however, are selected to offset or reduce the impact of the distortions caused by optical system 410', thus lightwave signal 426' emerges from the system having reduced, if not fully compensated, distortions. Precompensator 400' is guided by sensing and control unit 480, which provides a precompensation signal indicative of the frequency-dependent polarization effects in downstream optical system 410'. Any of the embodiments described previously for compensation system 100 can be implemented as precompensator 400'.

For example, precompensator 400' may be used to adjust the wavelength-by-wavelength SOP of the predistorted lightwave signal 420' so that the all or most of the wavelengths of the lightwave signal will emerge from the downstream optical system with a particular SOP. In addition, the SLM can precompensate for the lightwave signal frequency dependent delays caused by the optical system.

Alternatively, in other embodiments, the precompensator 400' may be used to adjust the wavelength-by-wavelength SOP of the predistorted lightwave signal 420' to match the wavelength dependent PSP of the downstream optical system. This can be useful because light launched with its SOP equal to a PSP exhibits no variation in its output SOP, to first order in frequency. In contrast, light launched with SOP not equal to a PSP does exhibit a variation in its SOP even to first order in frequency. Furthermore, launching the light to match the wavelength dependent PSP reduces wavelength-dependent variations in delay. This can be understood by realizing that there is no first-order PMD delay because the wavelength components are adjusted to match either the fast or slow axis corresponding to the wavelength dependent PSP.

Moreover, precompensator may further be used to the precompensate for the chromatic dispersion or variation in $\Delta \tau$ with frequency in optical system 410'. Furthermore, precompensator 400' provides additional methods for dealing with PDL that are not available to the post-compensation approach. In particular, precompensator 400' can align the SOP of predistorted signal 420' on a wavelength-by-wavelength basis to match the wavelength-dependent PDL axis in optical system 410' that minimizes loss.

Finally, FIG. 4c shows the compensation system described herein being used in reverse as an emulator 400" of an optical system having frequency-dependent polarization effects such as PMD. Thus, lightwave signal 418 enters emulator 400" and emerges as a distorted lightwave signal 420" having characteristics controlled by emulator 400". Thus, the emulator imposes a programmable distortion onto the input signal similar to that which would be observed due to PMD. A model of the frequency-dependent polarization effects to be emulated is input into emulator 400" and guides the design of the frequency filter. This function is useful for characterizing other types of PMD compensators or for testing transmission system performance as affected by PMD. Any of the embodiments described previously for compensation system 100 can be implemented as emulator 400". Notably, the emulator can be used to emulate transmission systems having arbitrary PMD statistics, e.g., statistics like those of an optical fiber or statistics different from those of an optical fiber.

A number of embodiments of the invention have been described. Nevertheless, it will be understood that various modifications may be made without departing from the spirit and scope of the invention. For example, some embodiments may incorporate both pre-compensation and post-compensation. In such case, a pre-compensation system may be used to match the wavelength-by-wavelength SOP of a lightwave signal to the wavelength-by-wavelength PSP of a downstream optical system. Thereafter, a post-compensation system can further reduce distortions in the optical signal caused by the optical system. Accordingly, other embodiments are within the scope of the following claims.

What is claimed is:

1. An optical processing method comprising:
receiving an optical signal from an optical system, wherein the optical signal is distorted by frequency-dependent polarization effects in the optical system that cause wavelength dependent changes in the state of polarization (SOP) of the optical signal;
spatially dispersing frequency components of the distorted optical signal on at least one spatial light modulator (SLM); and
independently adjusting a polarization transfer matrix of multiple regions of the at least one SLM to reduce the distortion of the optical signal by the frequency-dependent polarization effects, wherein the adjustments to the polarization transfer matrix are selected to cause independent adjustments to the state of polarization (SOP) of each of multiple subsets of the spatially dispersed frequency components.

2. The method of claim 1, wherein the frequency-dependent polarization effects include polarization mode dispersion effects.

3. The method of claim 2, wherein the polarization mode dispersion effects can be represented by a frequency-dependent polarization transfer matrix characterized by a frequency-dependent differential delay and principal states of polarization.

4. The method of claim 1, wherein the optical signal comprises multiple signals on separate wavelength bands.

5. The method of claim 1, wherein the optical system includes at least one optical fiber.

6. The method of claim 1, further comprising recombining the spatially dispersed frequency components following the adjustments by the spatial light modulator.

7. The method of claim 1, further comprising monitoring the frequency-dependent polarization effects from the optical system.

8. The method of claim 7, wherein the adjustments by the spatial light modulator are in response to the monitoring of the frequency-dependent polarization effects.

9. The method of claim 1, wherein the spatial dispersion of the frequency components comprises using a grating, a prism, an arrayed waveguide grating, or a virtually imaged phase array.

10. The method of claim 1, wherein the spatial light modulator comprises at least one liquid crystal layer.

11. The method of claim 10, wherein the spatial light modulator comprises at least two liquid crystal (LC) layers, wherein the LC molecules in each of the LC layers are oriented along an axis, and wherein the axis for one of the LC layers is different from the axis of another of the LC layers.

12. The method of claim 11, wherein the axes differ from one another by an absolute amount of about 45 degrees.

13. The method of claim 12, wherein the absolute amount is in the range of 42 degrees to 48 degrees.

14. The method of claim 11, wherein the spatial light modulator comprises at least three layers.

15. The method of claim 14, wherein the orientation axis of a first of the LC layers differs from the orientation axis of a second of the LC layer by absolute amount of about 45 degrees, and wherein the orientation of the second of the LC layers differs from the orientation axis of a third of the LC layers by an absolute amount of about 45 degrees.

16. The method of claim 1, wherein the adjustments to the polarization transfer matrix are selected to cause an adjustment to the state of polarization (SOP) and amplitude of each of multiple subsets of the spatially dispersed frequency components.

17. The method of claim 1, wherein the adjustments to the polarization transfer matrix are selected to cause independent adjustments to the phase and the state of polarization (SOP) of each of multiple subsets of the spatially dispersed frequency components.

18. The method of claim 17, wherein the frequency-dependent polarization effects include polarization mode dispersion (PMD), and the adjustments caused by the SLM at least partially compensate for the PMD.

19. The method of claim 1, wherein the distortions comprise broadening of mean pulse duration in the optical signal, and wherein the adjustments reduce the broadening caused by the optical system.

20. The method of claim 1, wherein the adjustments are selected to cause the state of polarization (SOP) of at least some of the frequency components to be substantially the same.

21. The method of claim 20, wherein the adjustments are selected to cause the delay of the at least some of the frequency components to be substantially the same.

22. The method of claim 20, wherein the adjustments are selected to cause the phase of the at least some of the frequency components to be substantially the same.

23. The method of claim 20, wherein the adjustments are selected to cause the phase of the at least some of the frequency components to vary substantially linearly with frequency.

24. The method of claim 1, further comprising using the SLM to selectively vary the intensity of at least some of the spatially dispersed frequency components.

25. The method of claim 1, wherein the adjustments are selected to independently delay a selected polarization component of each of multiple subsets of the spatially dispersed frequency components.

26. The method of claim 1, wherein the at least one spatial light modulator (SLM) comprises multiple spatial light modulators optically coupled to one another.

27. The method of claim 26, wherein the spatial light modulators are optically coupled to one another by an optical fiber.

28. An optical processing system for reducing a distortion in an optical signal transmitted through an optical system having frequency-dependent polarization effects that cause wavelength dependent changes in the state of polarization (SOP) of the optical signal, the optical processing system comprising:
  a dispersive module positioned to receive the optical signal and spatially separate frequency components of the optical signal;
  at least one spatial light modulator (SLM) having multiple regions with an independently adjustable polarization transfer matrix, the at least one SLM positioned to receive the spatially separated frequency components on the multiple regions; and
  a controller coupled to the at least one SLM,
  wherein during operation the controller causes the at least one SLM to independently adjust the polarization transfer matrix of the multiple regions to reduce the distortion of the optical signal by the frequency-dependent polarization effects, and
  wherein the adjustments to the polarization transfer matrix are selected to cause independent adjustments to the state of polarization (SOP) of each of multiple subsets of the spatially dispersed frequency components.

29. The system of claim 28, wherein the at least one spatial light modulator (SLM) comprises multiple spatial light modulators optically coupled to one another.

30. The system of claim 29, wherein the spatial light modulators are optically coupled to one another by an optical fiber.

* * * * *